C. O. POOR.
BATTERY CHUTE.
APPLICATION FILED MAY 18, 1908.
916,011.
Patented Mar. 23, 1909.
2 SHEETS—SHEET 1.
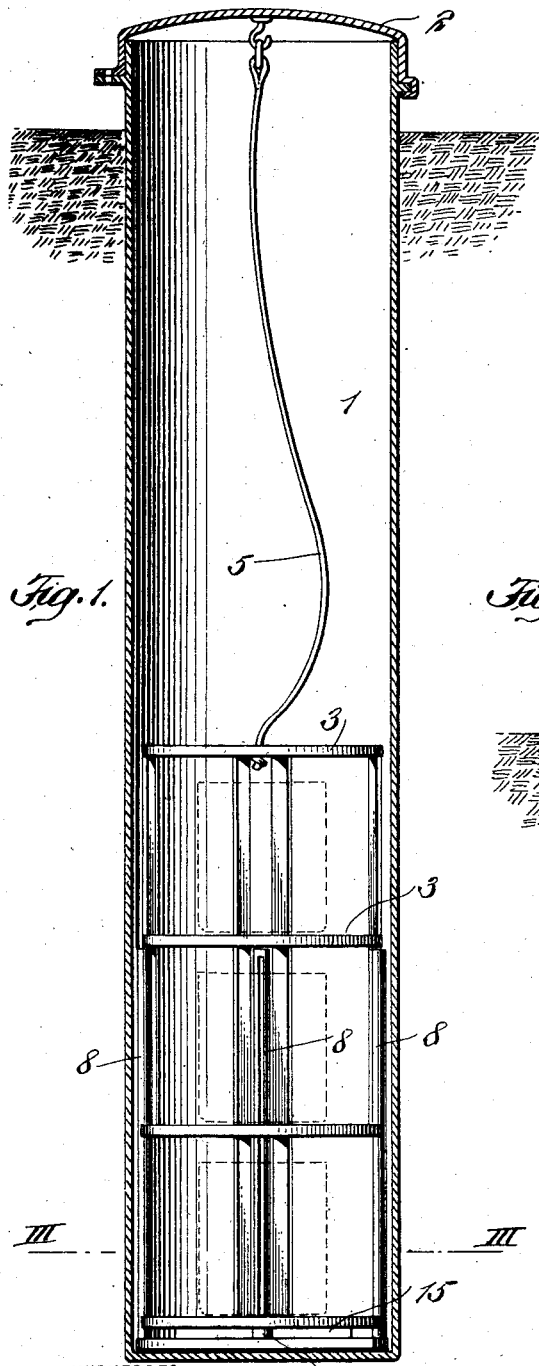
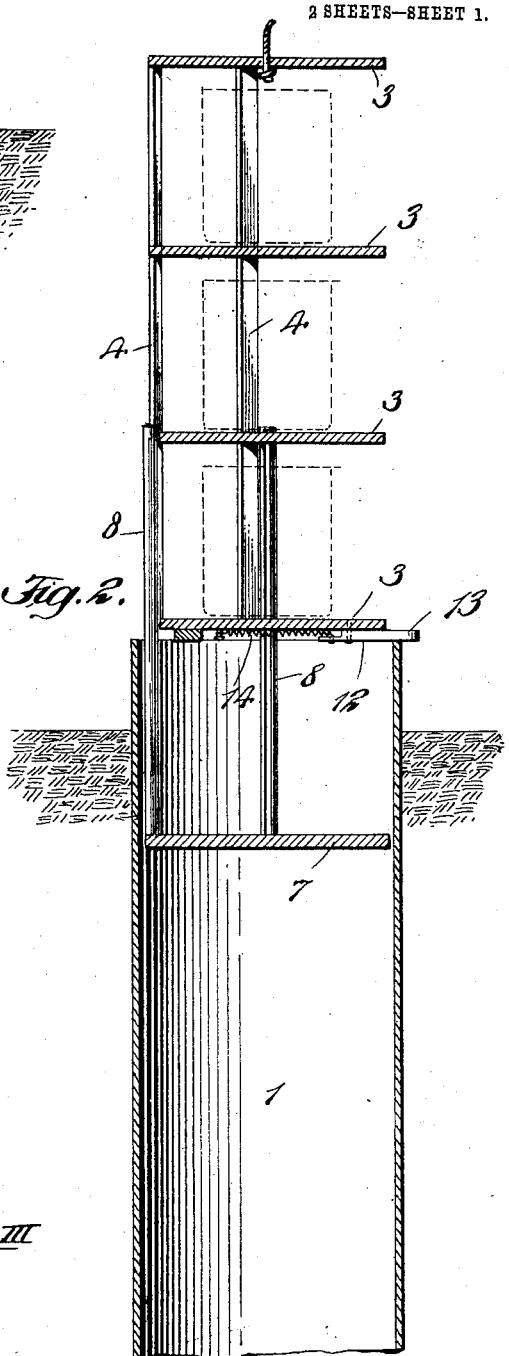
WITNESSES:
INVENTOR
Charles O. Poor
BY
Davis & Davis
ATTORNEYS

C. O. POOR.
BATTERY CHUTE.
APPLICATION FILED MAY 18, 1908.

916,011.

Patented Mar. 23, 1909.
2 SHEETS—SHEET 2.

WITNESSES:

INVENTOR
Charles O. Poor
BY
Davis & Davis
ATTORNEYS

UNITED STATES PATENT OFFICE.

CHARLES O. POOR, OF ROCHESTER, NEW YORK.

BATTERY-CHUTE.

No. 916,011.	Specification of Letters Patent.	Patented March 23, 1909.

Application filed May 18, 1908. Serial No. 433,516.

*To all whom it may concern:*

Be it known that I, CHARLES O. POOR, a citizen of the United States, residing in the city of Rochester, county of Monroe, State of New York, have invented certain new and useful Improvements in Battery-Chutes, of which the following is a specification, reference being had therein to the accompanying drawings, in which—

Figure 3:
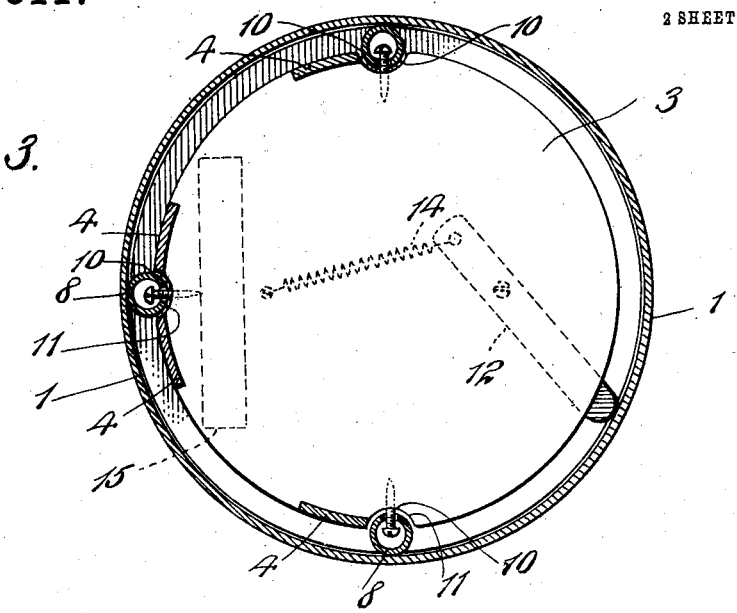

Figure 1 is a vertical section of the battery chute showing the battery shelves or elevator in side elevation at the bottom of the chute; Fig. 2 a similar sectional view at right angles to the section shown in Fig. 1, the battery shelves or elevator being raised and locked at the top of the battery chute; Fig. 3 a horizontal sectional view on the line III—III of Fig. 1; and Fig. 4 a detail perspective view of the elevator supporting frame.

In railway signal work gravity batteries are employed, and these batteries are placed at suitable points along the tracks to supply the necessary current for the track circuit. To protect the batteries from weather conditions, and particularly from frost, they are placed in battery chutes which extend into the earth below the frost line. The batteries are usually supported in a suitable frame which is adapted to be raised in the chute whenever it is desired to clean the batteries or to renew them. As these battery chutes are usually constructed it is necessary to entirely remove the battery elevator from them and to prop it up on a level spot on the ground near the chute, or to place it on some level structure, in order that the attendant may be free to work over the batteries. It is manifest to anyone familiar with conditions along a railroad track that it is extremely difficult to find a suitable place to stand the elevator, and for that reason it is the custom to provide two men who work together on these batteries, one being necessary to hold the battery elevator when the other works on the batteries. It frequently happens that the battery elevator is overturned and the battery cells destroyed.

It is one of the main objects of this invention to provide a battery chute wherein the battery elevator or shelves may be raised to the top of the chute and supported there in its upright position while the batteries are being cleaned or renewed.

Another object of the invention is to provide a battery elevator with a suitable supporting frame which will permit the elevator to be raised above the chute while the supporting frame extends down into the chute and supports the elevator in its upright position.

Another object of the invention is to provide automatic means for locking the battery elevator at the top of the chute when it has been raised.

Other important objects and advantages of the invention will appear hereinafter.

Referring to the various parts by numerals, 1 designates the battery chute, which, as shown, is in the form of a long vertical cylinder, having a closed lower end and an open upper end. This cylinder is buried for practically its entire length and extends into the ground a distance sufficient to permit the battery shelves to be lowered below the frost line. The upper end of this chute is adapted to be closed by the cover 2.

The battery elevator consists of a series of four circular shelves 3 connected together and supported equal distances from each other by side bars 4. By reference to Fig. 3 it will be noted that these side bars are arranged around only one-half of the shelves, so that the other half is free and unobstructed to permit the battery cells to be placed thereon and to be removed therefrom. To the top shelf is connected a rope or cable 5 by which the elevator may be raised. The upper end of this elevating means may be supported at the upper end of the chute in any suitable manner, as shown, it is connected to a hook secured to the inner side of the cover.

Figure 4:
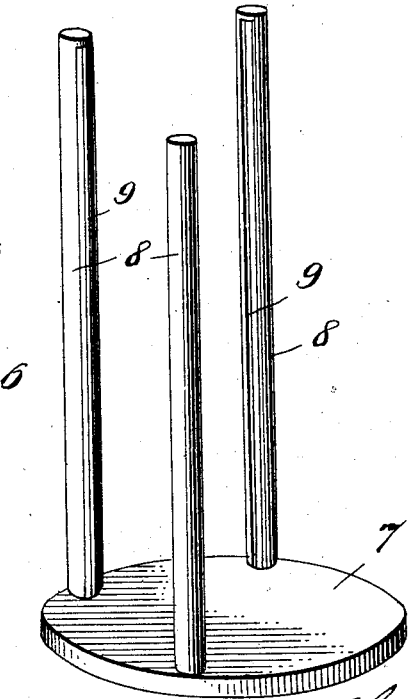

Within the battery chute is arranged an elevator supporting frame 6 which consists of a bottom piece 7 and a series of tubular uprights 8. These uprights are positioned substantially to correspond to the positions of the side pieces 4 of the elevator, two of them being at diametrically opposite points on the bottom piece 7 and the other being midway between the first mentioned two and between two adjacent and parallel side pieces 4 of the elevator. This arrangement is necessary in order to leave the lower shelf of the battery elevator free at one side for the insertion and removal of the battery cell on that shelf. The uprights or standards 8 are vertically slotted on their inner sides as at 9, and extending through said slots 9 are screws 10, the heads of said screws being within the standards. These screws enter the lower shelf 3 and the next shelf above the bottom, as shown clearly in Fig. 2 of the drawings. The upper ends of the slots 9 are closed as shown in Fig. 4, and the standards are substantially equal to one half the height of the battery elevator, so that the said elevator may have a vertical movement independently of the elevator support. In raising the elevator it will move independently of the supporting frame until the screws in the second shelf from the bottom engage the closed upper ends of the slots 9. The elevator and its supporting frame then move upwardly together. By this means the supporting frame will extend above the battery chute sufficiently to give a firm support to the elevator and to maintain it in its upright position. The supporting frame will also extend a sufficient distance down in the chute to prevent any material lateral tilting or inclination of the supporting frame and the battery elevator when the bottom shelf of the elevator is at the top of the chute. The edges of the elevator shelves, or of the two lower shelves, are recessed, as shown at 11 of Fig. 3, to receive the standards 8. It will, of course, be understood that these recesses may be dispensed with if desired, it being only necessary to reduce the diameter of the shelves to that extent.

The bottom shelf of the elevator carries means to engage the upper edge of the chute to support the elevator in its raised position, and consequently to also maintain the elevator supporting frame in its upper position. The means shown in the drawing for supporting the elevator operates automatically when the elevator has been raised to the top of the battery chute; and it consists of a pivoted latch bar 12 secured to the bottom of the lower shelf of the elevator, one end thereof, 13, being adapted to swing out over the top of the chute when the elevator is raised. Connected to the opposite end of this latch bar is a coil spring 14 which tends to keep the said bar in a radial position with respect to the bottom of the elevator, and serves to move said bar to that position when said bar is free of the chute.

As shown in Fig. 2 the elevator is supported in its raised position by the latch bar 12. When it is desired to lower the elevator the said bar may be released from the chute by rotating the elevator, or by swinging in the latch bar in any other manner. When the elevator is lowered within the chute the latch 12 bears against the inner side of the chute, as shown clearly in Fig. 3. To the bottom of the lower shelf of the elevator is secured a cleat 15 which is substantially equal in thickness to the latch bar and serves to hold the elevator in a vertical position when it is resting on the bottom of the elevator, and also serves to protect the coil spring 14.

From the foregoing it will be seen that I provide simple means for supporting the battery elevator at the top of the chute and automatically operating means for locking said supporting means when the elevator is raised to the proper height. It is important that the elevator supporting frame and the elevator telescope one within the other and that they should have a limited movement independently of each other, so that the battery chute need not be of any greater length than as used at present. In order to maintain the elevator in an upright position when raised, the supporting frame must extend a suitable distance above the chute and also a suitable distance down in the chute.

By the use of my invention it will be seen that all of the difficulties and objections to the old style of battery chute are avoided; that the batteries may be elevated and cleaned and repaired thoroughly and expeditiously and without the slightest danger to the batteries or battery connections, by one workman. One of the great objections to the battery chutes as at present employed is that when the batteries are lifted out of the battery chutes the battery wires are apt to become bent or kinked, and this constant bending and kinking of them soon results in a break. By my invention this danger is entirely avoided, while at the same time providing an extremely simple and efficient apparatus.

Having thus described my invention, what I claim as new and desire to secure by Letters Patent, is:—

1. A battery chute comprising a chute proper, a battery elevator therein, and means carried by said elevator to support it at the top of the chute, said means extending below the lower end of the elevator when the elevator is raised.

2. A battery chute comprising a chute proper, a battery elevator therein, and means carried by the elevator for automatically locking it at the top of the chute when the said elevator is raised, and means carried by the elevator to support it in its locked position, said means extending below the elevator when the elevator is raised to the top of the chute.

3. A battery chute comprising a chute proper, an elevator therein, a latch bar carried by the elevator at its lower end, said latch bar being adapted to be swung over the upper end when the elevator is raised to the top of the chute, and a supporting means carried by the elevator and extending down into the chute when the elevator is raised.

4. A battery chute comprising a chute proper, an elevator therein, a spring actuated latch carried by the elevator near its lower end and adapted to automatically lock the elevator when said elevator is raised to the top of the chute, and a supporting means carried by the elevator and extending down into the chute when the elevator is raised to the top of the chute.

5. A battery chute comprising a chute proper, an elevator therein, an elevator supporting frame connected to the lower end of the elevator and adapted to support the elevator at the upper end of the chute when the elevator is raised.

6. A battery chute comprising a chute proper, an elevator therein, an elevator supporting frame connected to the elevator and adapted to telescope over the lower end thereof and to support the elevator when the elevator is raised to the top of the chute.

7. A battery chute comprising a chute proper, an elevator therein, an elevator supporting frame slidably connected to the lower end of the elevator and adapted, when the elevator is raised, to extend above the chute to support the elevator in an upright position, and means to lock the elevator at the upper end of the chute.

8. A battery chute comprising a chute proper, an elevator therein provided with battery holding shelves, an elevator supporting frame slidably connected to the lower end of said elevator and adapted to extend into the chute and above the bottom shelf of the elevator when the elevator is raised to the top of the chute, and means to lock the elevator in its raised position.

9. A battery chute comprising a chute proper, an elevator therein provided with battery holding shelves, an elevator supporting frame slidably connected to the lower end of the elevator and consisting of vertically slotted uprights or standards, means connecting the lower end of said standards together, and means connecting said standards to the two lowermost shelves of the elevator, and means for locking the elevator in its raised position.

10. A battery chute comprising a chute proper, an elevator therein and a telescoping supporting frame connected to the elevator, and automatic means for locking the elevator at the top of the chute.

11. A battery chute comprising a chute proper, an elevator therein, a telescoping supporting frame connected to the elevator, and a spring actuated device carried by the elevator and adapted to engage the chute to lock the elevator in its raised position.

12. A battery chute comprising a chute proper, a battery elevator therein, and means to support said elevator at the top of the chute, said means extending down into the chute a sufficient distance to hold the elevator in an upright position above the chute.

13. A battery chute comprising a chute proper, a battery elevator therein, and means adapted to operate automatically to lock the elevator at the top of the chute when the elevator is raised, and a supporting means connected to the elevator and extending above the top of the chute and a sufficient distance down into the chute when the elevator is raised to maintain the elevator in an upright position.

14. A battery chute comprising a cylindrical chute proper, a battery elevator freely rotatable therein and unconnected with said chute, means carried by said elevator and adapted to be rotated therewith, said means extending below the lower end of the elevator when the elevator is raised and adapted to support it at the top of the chute.

15. A battery chute comprising a chute proper, a battery elevator freely rotatable therein and adapted to be raised and lowered, means carried by the elevator near its lower end for automatically locking it at the top of the chute when said elevator is raised, and means carried by the elevator and rotatable therewith to support the elevator at the top of the chute, said supporting means extending down into the chute when the elevator is raised.

16. A battery chute comprising a chute proper, a battery elevator freely rotatable therein and adapted to be raised and lowered, means carried by the elevator near its lower end for automatically locking it at the top of the chute when said elevator is raised, and means carried by the elevator and rotatable therewith to support the elevator at the top of the chute, said supporting means extending down into the chute when the elevator is raised, and also extending up around the elevator a suitable distance to prevent any accidental displacement of the elevator when it is raised.

In testimony whereof I hereunto affix my signature in the presence of two witnesses this 12th day of May 1908.

CHARLES O. POOR.

Witnesses:
W. CAIRNS,
J. B. EVANS.